United States Patent [19]
Rosner et al.

[11] Patent Number: 6,105,093
[45] Date of Patent: *Aug. 15, 2000

[54] INTERFACE MONITOR FOR COMMUNICATING BETWEEN DIFFERENT COMMUNICATION PROTOCOLS

[75] Inventors: Lisa E. Rosner, East Windsor; Karanam Rajaiah, Bristol; Jonathan A. Wolf, Middletown; Karl D. Pedersen, Ansonia; Veronica Kertesz, Bristol, all of Conn.

[73] Assignee: General Electric Company, Schenectady, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/804,052

[22] Filed: Feb. 21, 1997

[51] Int. Cl.$^7$ .................................................. G06F 13/00
[52] U.S. Cl. ............................................................ 710/105
[58] Field of Search ................................... 395/285, 286, 395/882, 891, 892, 500; 370/908; 710/105, 106, 62, 71, 72; 713/300, 555; 364/493

[56] References Cited

U.S. PATENT DOCUMENTS

| | | | |
|---|---|---|---|
| 4,675,481 | 6/1987 | Markowski et al. | 200/144 |
| 5,127,090 | 6/1992 | Ruehle et al. | 395/325 |
| 5,245,703 | 9/1993 | Hubert | 395/200 |
| 5,303,344 | 4/1994 | Yokoyama et al. | 395/200 |
| 5,343,319 | 8/1994 | Moore | 359/152 |
| 5,355,365 | 10/1994 | Bhat et al. | 370/85.13 |
| 5,371,858 | 12/1994 | Miller et al. | 395/275 |
| 5,387,994 | 2/1995 | McCormack et al. | 359/159 |
| 5,564,061 | 10/1996 | Davies et al. | 395/884 |
| 5,583,764 | 12/1996 | Nail et al. | 364/420 |
| 5,596,473 | 1/1997 | Johnson et al. | 361/97 |
| 5,739,648 | 4/1998 | Ellis et al. | 318/112 |

FOREIGN PATENT DOCUMENTS 2267801  12/1993  United Kingdom .

OTHER PUBLICATIONS

Sobolewski, John S. "Modem"; Encyclopedia of Computer Science, 3rd edition; pp. 892–894, 1993.

*Primary Examiner*—Glenn A. Auve
*Attorney, Agent, or Firm*—Cantor Colubrn LLP; Damian G. Wasserbauer; Carl B. Horton

[57] ABSTRACT

An interface monitor is connected with a LAN that is formatted with an RS-485 protocol and which is interconnected with a plurality of electrical distribution devices. The monitor includes a socket connection for receiving an RS-232 plug from a PC and software logic for interpreting between the RS-232 and RS-485 formats. The PC is enabled for communicating with each one of the electrical distribution devices.

20 Claims, 4 Drawing Sheets

INTERFACE MONITOR FOR COMMUNICATING BETWEEN DIFFERENT COMMUNICATION PROTOCOLS

BACKGROUND OF THE INVENTION

The interconnection of a number of electrical equipment for supervisory control and data acquisition is described within U.S. patent application Ser. No. 08/628,533 filed Apr. 3, 1996 entitled "Dynamic Data Exchange Server Simulator". The electrical equipment is interconnected within a LAN utilizing a Modbus protocol which is a trademark of New Modicon Inc. for RS-485 data format.

When a personal computer is to be connected with the LAN to interrogate the status of any of the equipment, the computer modem port is temporarily connected with the LAN by means of the modem port that is adapted for receiving data in RS-232 data format. Additional software must be included within the personal computer and the connector cable must be adapted for direct connection with the LAN.

One example of a method for interrogating a circuit breaker operating within a LAN is found in U.S. Pat. No. 5,596,473 entitled "Electrical Switches With Current Protection Interfaced With A Remote Station and A Portable Local Unit".

Various modules are commercially available for connecting between RS-232 data format and proprietary protocol used within most LAN systems as described within the following U.S. patents.

U.S. Pat. No. 5,127,090 entitled "Map Interface Unit (MAP) for Industrial Programmable Logic Controllers" describes a manufacturing automation protocol (MAP) interface unit that couples a LAN, connecting with programmable logic controllers, to a MAP network.

U.S. Pat. No. 5,245,703 entitled "Data Processing System With Multiple Communication Buses and Protocols" discloses an interface unit for connecting between internal and external communication buses having different protocols.

U.S. Pat. No. 5,355,365 entitled "Intelligent Local Area Network Modem Mode" describes a LAN modem node that allows PC's on the LAN to communicate with off-LAN PC's, printers and other local area networks.

When there is a need for a host PC to communicate with any of the electrical equipment on the LAN, as described within the aforementioned U.S. patent application Ser. No. 08/628,533, it would be convenient to interpose a monitor unit having capacity to receive both RS-232 configured and RS-485 configured plug sockets along with the capacity to translate between the associated RS-232 and RS-485 protocols.

One purpose of the invention, accordingly, is to provide a stand-alone monitor unit that allows external connection with a dedicated LAN by use of standard PC connector cables.

SUMMARY OF THE INVENTION

An interface monitor is connected with a LAN that is formatted with an RS-485 protocol and which is interconnected with a plurality of electrical devices. The monitor includes a socket connection for receiving an RS-232 plug from a PC and includes sufficient software logic for interpreting between the RS-232 and RS-485 formats. The PC is enabled for communicating with each one of the electrical devices.

DESCRIPTION OF THE PREFERRED EMBODIMENT

Figure 1:
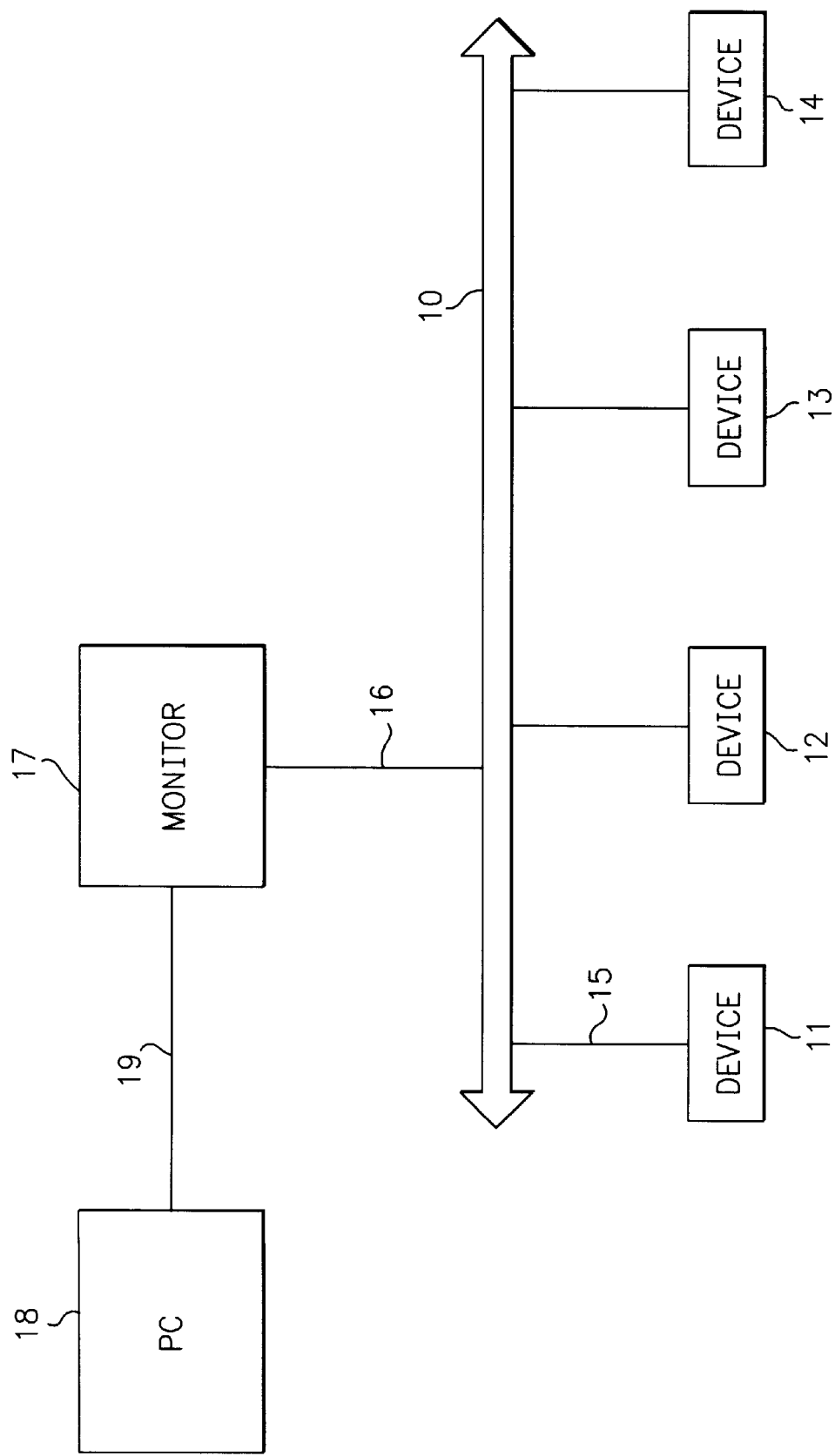
FIG. 1 is schematic representation of the interface monitor connection between a PC and LAN according to the invention.

As shown in FIG. 1, a number of distributed electrical metering and control devices 11–14, such as relays, meters, circuit breakers and the like described in the aforementioned U.S. patent application Ser. No. 08/628,533, are interconnected by means of a cable connector 15 with a LAN 10 containing RS-485 protocol. A good example of a circuit breaker having such communication facility is found in U.S. Pat. No. 4,675,481 entitled "Circuit Breaker and Protective Relay Unit". When a PC 18 such as an IBM 350-P75 is required to address any of the devices to request status and other information, the PC is connected by means of a cable connector 19 with a monitor unit 17 in the form of an enclosure that contains a plurality of circuit components which will be described later with reference to FIG. 3. The monitor 17 connects with the LAN by means of a cable connector 16. Since the cable connector 19 is removably-connectable with the monitor, various PC's can be connected at different times to access the LAN without requiring any modification to the PC or the monitor to make the connection.

Figure 2:
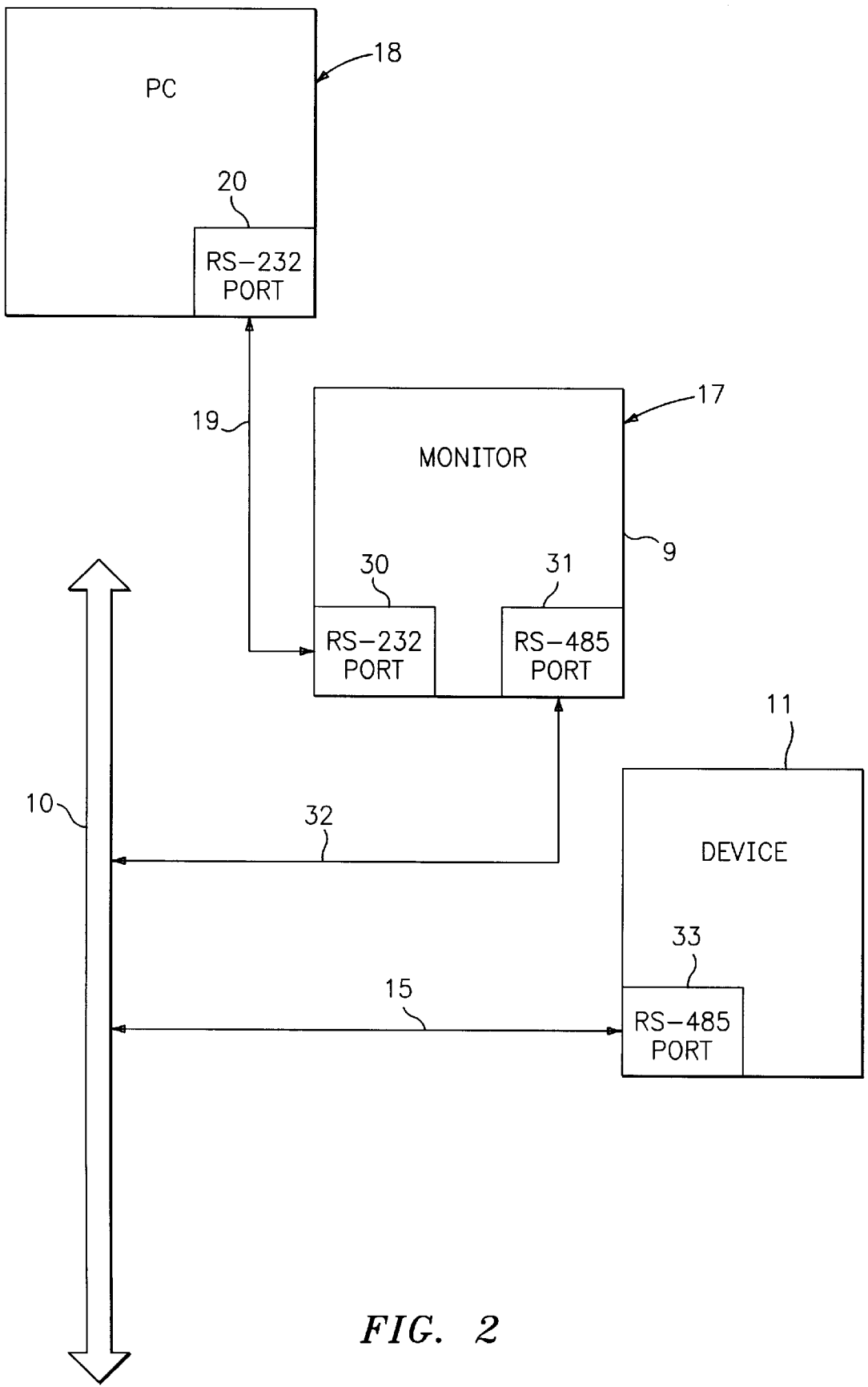
FIG. 2 is an enlarged schematic representation of the components within the representation depicted in FIG. 1.

This feature is best understood by now referring to FIG. 2 wherein the PC 18 is shown having an RS-232 socket or port 20 arranged on a rear surface thereof. The enclosure 9 that defines the monitor 17 includes both an RS-232 port 30 for receiving the cable connector 19 from the PC 18 as well as an RS-485 port 31 for receiving the cable 32 that connects with the LAN 10. The electrical device 11, consisting of a circuit breaker, meter or the like, connects with the LAN 10 by means of the cable 15 and the RS-485 port 33. Communication between the RS-232 port 30 and the RS-485 port 31 is made by a conversion algorithm resident within the monitor microprocessor described earlier. It is thus seen that at different times, different PC's 18 can communicate with any number of devices 11 by the use of a single monitor 17, in accordance with the teachings of the invention.

Figure 3:
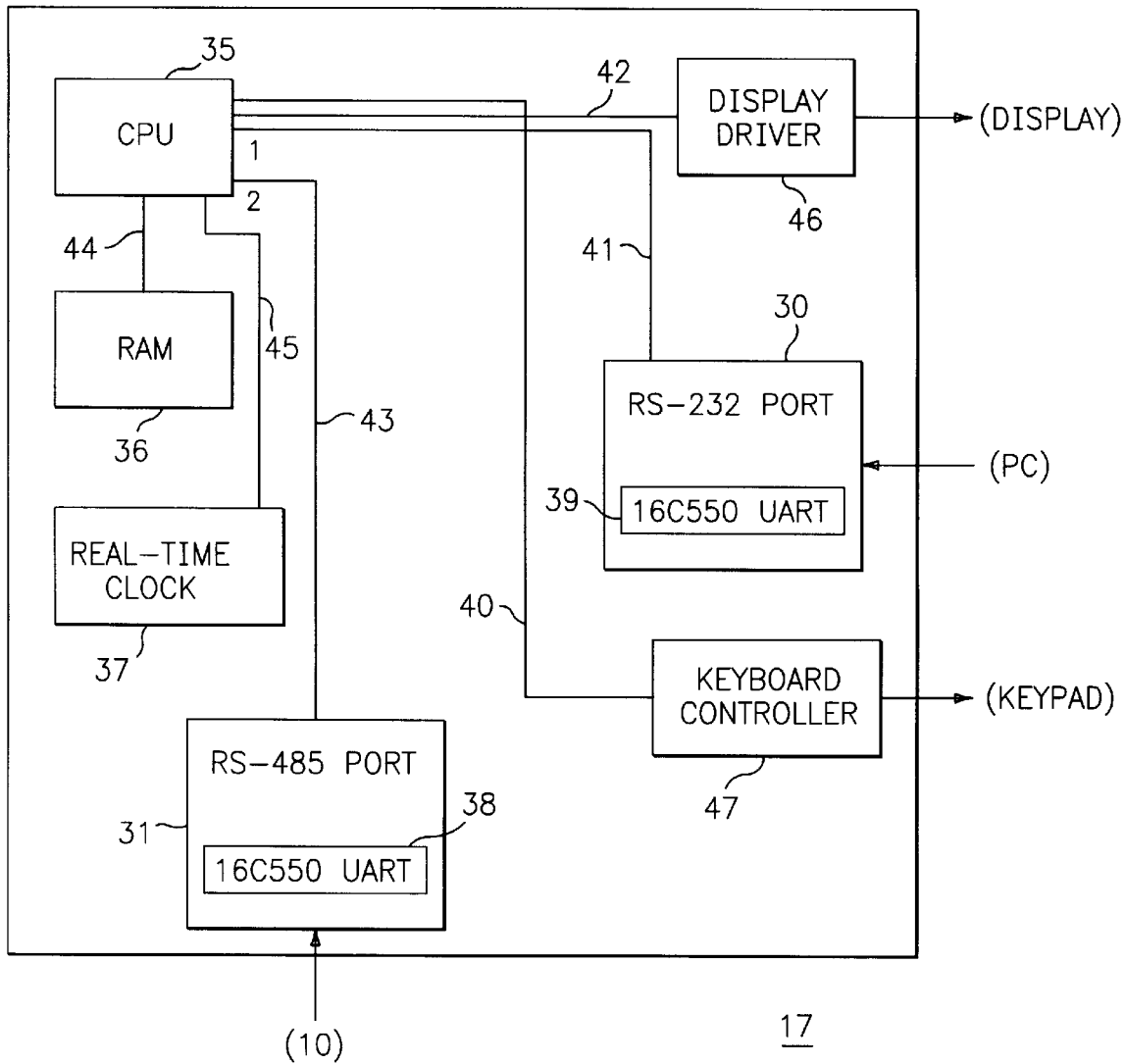
FIG. 3 is an enlarges schematic representation of the components within the monitor unit of FIG. 2.

As shown in FIG. 3, the monitor 17 includes a CPU in the form of a microprocessor 35 connecting with a display driver 46 over rail 42 and with a keyboard controller 47 over rail 40 to provide external keypad and display facility. The microprocessor connects with a RAM 36 over rail 44 and the RAM contains a program for converting RS-232 protocol resident in the PC modem with the protocol employed within the LAN 10 of FIG. 1 in the manner to be described below. To provide timing facility, the microprocessor connects with a clock 37 over rail 45. In further accordance with the teachings of the invention, the RS-232 port 30 includes a Universal Address Radio Transceiver "UART" 39 such as an SP type 16C550 configured for RS-232 communications and connects with the microprocessor over rail 41. The RS-485 port 31 includes a similar UART 38 configured for RS-485 communication. As shown earlier, in FIG. 2, the PC 18 connects with the RS-232 port 20 and the LAN 10 connects with the RS-485 port 31. The conversion program within the RAM 36 operates in the following manner. When a message is received on the RS-232 port 30, the UART 39 passes a byte to the microprocessor port 1 over rail 41. The microprocessor 35 then copies the message to port 2, which transmits the message to the RS-485 port 31 over rail 43. When a message is received at the RS-485 port 31, the UART 38 passes a byte to the microprocessor port 2 over rail 43. The microprocessor 35 then copies the message to port 1, which transmits the message to the RS-232 port 30 over rail 41.

Figure 4:
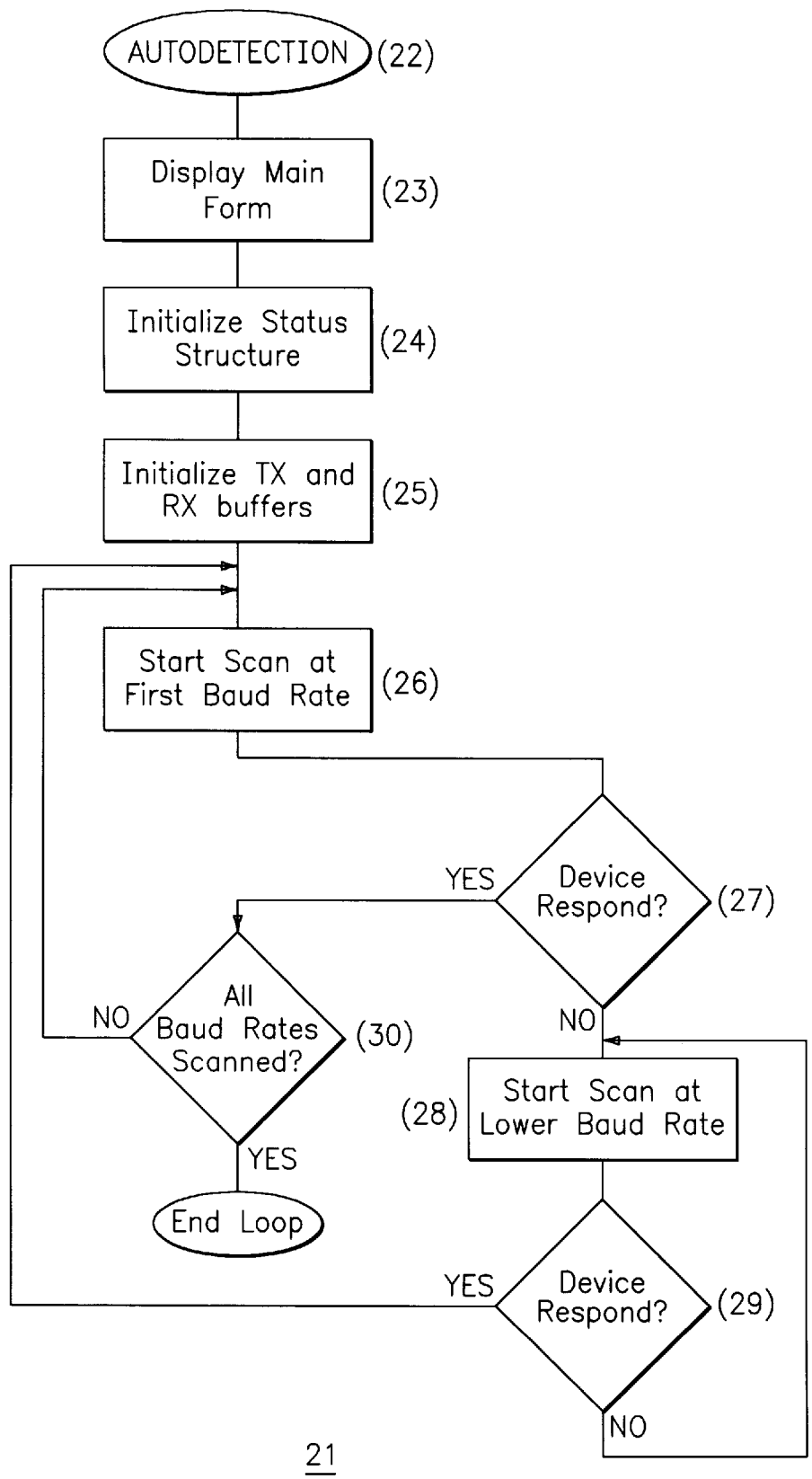
FIG. 4 is a flow chart representation of the algorithms contained within the interface monitor of FIGS. 1 and 2.

To provide address between any of the electrical devices 11–14 of FIG. 1, the Flow Chart 21 depicted in FIG. 4 is employed as follows. Auto detection (22) provides a means of self-configuring by scanning the LAN for all devices 11–14. The auto detection program resident in the monitor 17 (FIG. 2) scans all device addresses and waits for a response from the device. By inspecting the response received, the device characteristics can be determined. Absence of a device at a particular address is determined when a time-out condition occurs. Two retries are attempted to determine if a device is at a given address.

When auto detection (22) is requested, the port configuration file is sent to the monitor to ensure that the ports 33 of FIG. 2 are set up properly. If the auto detection is successful, the devices found on the network are stored in a database file within the monitor and analyzed. Devices that match a device already stored in the database file are discarded. Devices that are not in the database file are added. Devices that are unknown are marked as unknown and added to the database file. Devices already in the database file are retained. When the database file is about to be saved, if unknown devices are present, indication is made that unknown devices exist and will be deleted. If any unknown devices exist at the time the database file is to be saved permanently, these devices are deleted.

The main form is displayed (23) on the PC screen upon startup of the Autodetection program allowing the PC operator to initialize the status structure (24) and the internal PC transmitter and receiver buffers (25).

The device scan process is started at a first baud rate(26) and messages are sent to each device address stored in the monitor data file at a first baud rate to determine if the address is correct. If the device fails to respond after two attempts (27), the baud rate is lowered by a defined increment and the request is repeated (28) until a response is received and until all the devices have been scanned (29, 30).

Another application of the monitor 17 shown in FIGS. 1 and 2 is to provide standby master control facility to the devices listed within the aforementioned U.S. patent application Ser. No. 08/628,533, in the event the master server becomes disabled. The monitor having acquired the function and location of all the devices within the LAN is then able to communicate with the devices to provide supervisory data acquisition and control function.

A monitor unit has herein been described for allowing access between a PC employing one communications protocol to access any one of a series of devices connected within a LAN having a different protocol.

What is claimed is:

1. A communications monitor unit for intercommunication between an external computer and a network including a plurality of electrical metering and control devices; the monitor unit comprising:

an enclosure;

a processor disposed within the enclosure;

a first port coupled to the external computer for transmitting data between the external computer and the communications monitor in an RS-232 communications protocol;

a second port coupled to the network for transmitting the data between the network and the communications monitor in an RS-485 communications protocol; and an auto detection program resident in the communications monitor;

wherein said processor executes said auto detection program to determine a characteristic of each of the plurality of electrical metering and control devices.

2. The monitor of claim 1 wherein the network is a LAN.

3. The monitor of claim 1 wherein the external computer is a PC.

4. The monitor of claim 1 wherein the external computer includes a modem adapted for the RS-232 communications protocol.

5. The monitor of claim 1 wherein said processor executes said auto detection program to scan addresses of the plurality of electrical metering and control devices.

6. The monitor of claim 1 further including a first UART connecting to the first port and a second UART connecting to the second port.

7. The monitor of claim 1 wherein said processor executes said auto detection program to populate a database file for storing information about the plurality of electrical metering and control devices.

8. A power management system for monitoring a plurality of electrical metering and control devices; said system comprising:

a network interconnecting the plurality of electrical metering and control devices;

an external computer for monitoring the plurality of electrical metering and control devices;

a communications monitor unit including:

a processor;

a first port coupled to the computer for transmitting data between the external computer and the communications monitor unit in an RS-232 communications protocol;

a second port coupled to the network for transmitting data between the plurality of electrical metering and control devices and the communications monitor unit in an RS-485 communications protocol;

an auto detection program resident in the communications monitor unit; and a database file for storing information about the plurality of electrical metering devices;

wherein the processor executes said auto detection program to populate said database file.

9. The management system of claim 8 wherein the network is a LAN.

10. The management system of claim 8 wherein the external computer is a PC.

11. The management system of claim 8 wherein said processor executes said auto detection program to determine a characteristic of each of the plurality of electrical metering and control devices.

12. The management system of claim 8 wherein said processor executes said auto detection program to scan addresses of the plurality of electrical metering and control devices.

13. The management system of claim 8 further including a first UART connecting to the first port and a second UART connecting to second port.

14. The monitor of claim 8 wherein said communications monitor communicates with the plurality of electrical metering and control devices and provides supervisory control to the plurality of electrical metering and control devices upon failure of the external computer.

15. A method for requesting and receiving information from a plurality of electrical metering and control devices located on a communications network, the communications network including an external computer arranged to communicate with a monitor computer in the RS-232 protocol, the monitor computer arranged to communicate with the plurality of electrical metering and control devices in the RS-485 protocol, the method comprising:

(a) sending messages from the monitor computer to each electrical metering and control device at a predetermined baud rate using the RS-485 protocol;

(b) waiting a predetermined time period for a response from each device;

(c) for each device that does not respond, lowering the baud rate by a predetermined increment and repeating steps (a) and (b); and, (d) transmitting the response from the monitor computer to the external computer in an RS-232 protocol.

16. The method of claim 15 further comprising:

storing the response in a database file.

17. The method of claim 15 further comprising:

repeating steps (a) and (b) two times prior to the step of lowering the baud rate.

18. The method of claim 15 wherein the response includes a device address, the method further comprising:

discarding the device address if the device address received matches a device address already stored in the database file.

19. The method of claim 15, wherein the step of lowering the baud rate is repeated until each device that does not respond has been scanned at a final baud rate.

20. The method of claim 15 further comprising:

receiving a response including device characteristics from one of the electrical metering and control devices.

* * * * *